(12) United States Patent
Juday

(10) Patent No.: US 6,680,797 B2
(45) Date of Patent: Jan. 20, 2004

(54) SPATIAL LIGHT MODULATORS FOR FULL CROSS-CONNECTIONS IN OPTICAL NETWORKS

(75) Inventor: Richard D. Juday, Longmont, CO (US)

(73) Assignee: The United States of America as represented by the National Aeronautics and Space Administration, Washington, DC (US)

(*) Notice: Subject to any disclaimer, the term of this patent is extended or adjusted under 35 U.S.C. 154(b) by 226 days.

(21) Appl. No.: 09/888,041

(22) Filed: Jun. 21, 2001

(65) Prior Publication Data

US 2003/0002134 A1 Jan. 2, 2003

(51) Int. Cl.[7] .......................... G02B 27/28; G02B 6/00; G02F 1/295; H04J 14/02
(52) U.S. Cl. ........................ 359/484; 359/583; 385/10; 385/11; 385/16; 385/24; 385/47; 349/17; 349/201; 398/45; 398/65; 398/82; 398/152
(58) Field of Search ............... 359/320, 484, 359/583, 109–195; 385/8, 10, 11, 16–18, 24, 47; 349/17, 18, 201, 202; 398/45, 55, 65, 82, 152, 188, 205; 356/364–368

(56) References Cited

U.S. PATENT DOCUMENTS

| | | | | |
|---|---|---|---|---|
| 3,572,938 A | * | 3/1971 | Bradford | 356/367 |
| 3,741,661 A | * | 6/1973 | Yamamoto et al. | 356/368 |
| 3,988,067 A | * | 10/1976 | Yamamoto et al. | 356/368 |
| 5,768,242 A | | 6/1998 | Juday | 369/103 |
| 5,859,728 A | | 1/1999 | Colin et al. | 359/561 |
| 6,055,086 A | | 4/2000 | Sourtar et al. | 359/246 |
| 6,220,710 B1 | * | 4/2001 | Raj et al. | 353/20 |
| 2002/0131143 A1 | * | 9/2002 | He | 359/246 |

FOREIGN PATENT DOCUMENTS

JP          61038934 A     *   2/1986   ............. G02F/1/31

OTHER PUBLICATIONS

Richard D. Juday, Generality of Matched Filtering and MED Projection for Optical Pattern Recognitiion, Journal of the Optical Society of America–A (JOSA–A), vol. 18, No. 8, Aug. 2001, pp. pp. 1882–1896.
J. W. Goodman et al., "Optical Interconnections for VLSI Systems", Proc. IEEE, vol. 72, p. 850–866, (1984).
A. Husain, "Optical Interfaces for Digital Circuits and Systems" SPIE vol. 466, No. 24, (1984), pp. 10–20.
Richard D. Juday, "Optimal Realizable Filters and the Minimum Euclidean Distance Priniple", Applied Optics, vol. 32, No. 26, Sep. 10, 1993, pp. 5100–5111.

* cited by examiner

Primary Examiner—Evelyn Lester
(74) Attorney, Agent, or Firm—James M. Cate

(57) ABSTRACT

A polarization-independent optical switch is disclosed for switching at least one incoming beam from at least one input source to at least one output drain. The switch includes a polarizing beam splitter to split each of the at least one incoming beam into a first input beam and a second input beam, wherein the first input beam and the second input beams are independently polarized; a wave plate optically coupled to the second input beam for converting the polarization of the second input beam to an appropriately polarized second input beam; a beam combiner optically coupled to the first input beam and the modified second input beam, wherein the beam combiner accepts the first input beam and the modified second input beam to produce a combined beam; the combined beam is invariant to the polarization state of the input source's polarization; and a controllable spatial light modulator optically coupled to the combined beam, wherein the combined beam is diffracted by the controllable spatial light modulator to place light at a plurality of output locations.

18 Claims, 4 Drawing Sheets

SPATIAL LIGHT MODULATORS FOR FULL CROSS-CONNECTIONS IN OPTICAL NETWORKS

ORIGIN OF INVENTION

The invention described herein was made by an employee of the United States Government and may be manufactured and used by or for the government of the United States of America for governmental purposes without the payment of any royalties thereon or therefor.

FIELD OF THE INVENTION

The present invention relates to the use of light modulation in the field of optical switches for optical networks.

BACKGROUND OF THE INVENTION

Modern communication systems frequently use light carriers because of the large bandwidth inherent in light signals. In order to use light as a carrier, however, it is necessary to build switches that can make the necessary connections between the source and the destination of the signal. Traditionally, these switches involve modulation and demodulation to convert the optical signals into electrical signals and then convert the electrical signals back to optical signals. Such traditional electronic interconnection techniques have several physical limitations, such as poor synchronization and low bandwidth, which cannot support the interconnection density, speed, and signal bandwidth of an optical network. To overcome these problems, optical interconnection techniques have been developed. (Such techniques are detailed, for example, in J. W. Goodman et al., Proc. IEEE, 72, 850 (1984) and A. Husain, SPIE 466, 24, (1984)).

There are several techniques for optical interconnections. One area of active development in optical interconnection techniques at present is the use of reconfigurable liquid crystal devices such as spatial light modulators (SLMs) in optical switches. An SLM can be generally characterized as a reconfigurable optical element (e.g., a reconfigurable liquid crystal device). SLMs are available in both electrically-addressable (EASLM) and light-addressable (LASLM) configurations. Often each pixel in a reconfigurable liquid crystal device acts as an independent rotatable waveplate, such that an applied voltage rotates the birefringent axes. Owing to this property, liquid crystal light modulators may be used as holographic optical elements (HOEs), which are capable of producing computer generated holograms (CGHs). Such computer generated holograms have particular applications to free space diffraction-based optical switching. For example, SLM-based holographic optical elements (HOEs) can be used to connect light either from a single source simultaneously to a number of destinations or conversely from a plurality of sources to a single destination. This is described in U.S. Pat. No. 5,768,242, issued to Juday and assigned to the same assignee hereof. This patent is incorporated herein by reference.

For a cross bar switch with a dimension of $N_{in}$ and $N_{out}$ at input and output, respectively, the number of potential connection points is $N_{in} \times N_{out}$. Though they need not all be realized for the device to be useful, the number of possible connection patterns is exponential in that product. In the matrix of connection patterns, each connection can independently be on or off, so the number of connection patterns is $2^{(N_{in} \times N_{out})}$. In a simple 2×2 array, for example, there are $2^{(2 \times 2)} = 16$ potential interconnection patterns. If inputs are enumerated as A and B and outputs as 1 and 2, these patterns are: (none), A1, B1, A2, B2, A1&B1, A1&A2, A1&B2, A2&B1, B1&B2, A2&B2, A1&A2&B1, A1&B1&B2, A1&A2&B2, A2&B1&B2, A1&A2&B1&B2. The number of possible interconnection patterns becomes even more complex with increasing numbers of input and output optic fibers. In order to handle such complex interconnections, flexible and versatile switches are required. The SLM-based optical switches are particularly well-suited for this purpose.

Most SLM-based optical switches are shift invariant, i.e., when the input and the output shift in a corresponding amount but the output is not otherwise altered. Shift invariance of a holographic connection dictates that each of the input sources will be diffracted into the same number of output spots because the patterns of locations to which the output spots are directed are translated in accordance with how the input sources are translated with respect to each other. Thus, it becomes important that in selecting patterns of input locations, output locations, and locations of holographically created spots to make optical connections, all three of these items be simultaneously considered.

Traditionally, SLM-based optical switches have their input and output optic fibers arranged in a regularly spaced rectilinear geometry. This geometry exacerbates the cross-talk problems resulting from coherent buildup of diffractive sidelobes. The rectilinear geometry also makes poor use of the real estate in the area, when such diffractive sidelobe-related cross-talk can be avoided by moving a receptive area off to the side of a rectilinear array of spots. Therefore, it is desirable to have a method to optimize the locations of the output optical fibers in order to minimize cross-talk.

In order to optimize the arrangement of the input and output optic fibers in the optical switches, it is necessary that the holograms be accurately computed. Prior art SLMs are often modeled as being some ideal: amplitude variation is used to block light and phase is used to retard, and thus redirect, it. These computations of holograms have been done under the assumption that the behavior is purely phase variation or purely amplitude variation. In reality, amplitude and phase often co-vary. Incorrect modeling of the behavior of the light control causes less than optimal results in the face of realistic physical devices. U.S. Pat. No. 5,768,242 discloses a process which fully accommodates the actual behaviors of SLMs; this process acknowledges that phase (retardation) and amplitude of transmission co-vary. With this process, it is possible to accurately model the holograms for optimizing the geometry in an optical switch in order to minimize cross-talk.

Most observed actions of SLMs depend on the polarization states of the incoming light and, if there is a polarizer (whether intentionally placed or implicit in the optics), the outgoing optics. However, there is no guarantee of the polarization state of incoming light from many kinds of fiber optic lines. As a result, modulation by SLMs tends to be highly variable. This is especially problematic with a full crossbar switch, because the light beams from several fiber sources are simultaneously involved, and their polarizations may be random with respect to each other, unless these polarizations are specifically controlled, for example, by the use of expensive polarization-maintaining fiber. Therefore, it is desirable that an optical switch be capable of handling incoming light with arbitrary polarization states to produce effects that are invariant to the incoming polarization states.

SUMMARY OF INVENTION

One aspect of the invention relates to optical switches for connecting a light source to a light receiver. One embodiment of the invention is a polarization-independent optical switch for switching at least one incoming beam from at least one input source to at least one output drain. The optical switch comprises a polarizing beam splitter to split each of the at least one incoming beam into a first input beam and a second input beam, wherein the first input beam and the second input beam are independently polarized; a wave plate optically coupled to the second input beam for modifying the polarization of the second input beam to generate a modified second input beam; a beam combiner optically coupled to the first input beam and the modified second input beam, wherein the beam combiner refracts and transmits the first input beam and the modified second input beam to produce a combined beam; and a controllable spatial light modulator optically coupled to the combined beam, wherein the combined beam is transmitted by the controllable spatial light modulator that effects a hologram. This optical structure is referred to as a "polarization rectifier". It delivers light from an arbitrary input polarization state into a given output polarization state. Further, it does so without extinguishing the light in any input polarization state; this feature discriminates it from an optical analyzer.

Another aspect of the invention relates to an optical switch system, comprising a plurality of input optical fibers, a controllable spatial light modulator-based optical switch optically coupled to the input optical fibers, and a plurality of output optical fibers optically coupled to the controllable spatial light modulator-based optical switch, wherein the output optical fibers are not arranged in a rectilinear geometry.

Another aspect of the invention relates to a method for switching an optical network connection from a plurality of incoming optical fibers to a plurality of output optical fibers. The method comprises passing an incoming beam from the input optical fibers through a polarization rectifier to produce a beam in a particular polarization state ("particularly polarized beam"), and passing the particularly polarized beam through a controllable spatial light modulator, wherein the particularly polarized beam is diffracted and transmitted by the controllable spatial light modulator to form a pattern of light spots with at least one light spot landing on at least one output optical fibers.

Yet another aspect of the invention relates to a method for manufacturing a controllable spatial light modulator-based optical switch. The method comprises assembling an optical switch between a plurality of input optical sources and a plurality of output optical drains, wherein the optical switch comprises a controllable spatial light modulator (and possibly a polarization rectifying optics), and tuning the controllable spatial light modulator, wherein a hologram effected in the modulator causes a light beam from the incoming optical fibers to have light spots landing on the outgoing optical fibers.

It should be appreciated that the term 'optical fibers' are used herein to refer generally to the input optical sources and the output optical drains. The input optical sources may include light-emitting diodes, laser diodes, or other suitable sources of input light; similarly, the output optical drains may include detectors of light or light guides other than fibers at the output locations. In addition, a spatial light modulator is often described as being a 'liquid crystal' modulator. However, where polarization is important to the modulator's operation, any birefringent modulator may be used, not just one that uses liquid crystal as the active medium. When the polarization state is not of primary importance to the function of the modulator (e.g. where the modulator functions by moving small mirrors), the modulator may use other devices.

DETAILED DESCRIPTION

In order to make best use of holographic all-light connections, improvements over the prior art are presented. Embodiments of the present invention relate to methods of building diffraction patterns (holograms) so that a plurality of connections may be made with spatial distribution in two or three dimensions between sources (incoming light from fibers or light emitting diodes) and drains (outgoing light transmitting into fibers or landing on localized detectors). The methods of the invention have several advantages, which may include one or more of the following: direct optimization of switch properties (as opposed to prior art methods of indirect optimization) both in the computational setup phase and in the final assembly tune-up; invariance to state of polarization; minimization of cross-talk; a full connectivity matrix; retention of information in light-borne form so that detection and re-emission are avoided; accommodation to realistic properties of spatial light modulators in the switch; an automated method of dynamic alignment following parts assembly; and switching in a single stage rather than multiple "butterfly" stages as in the prior art methods. In addition, the methods of the invention permit a computational tradeoff among desirable switch features that may be at odds with each other (for example, diffraction efficiency, uniformity of connection strengths, and cross-talk). The methods can operate in the Fresnel diffraction approximation (i.e., near field) rather than necessarily in the Fourier approximation (i.e., far field) and are accommodating of less than ideal fixed optical elements (e.g., allowing the use of less expensive lenses).

Figure 1:
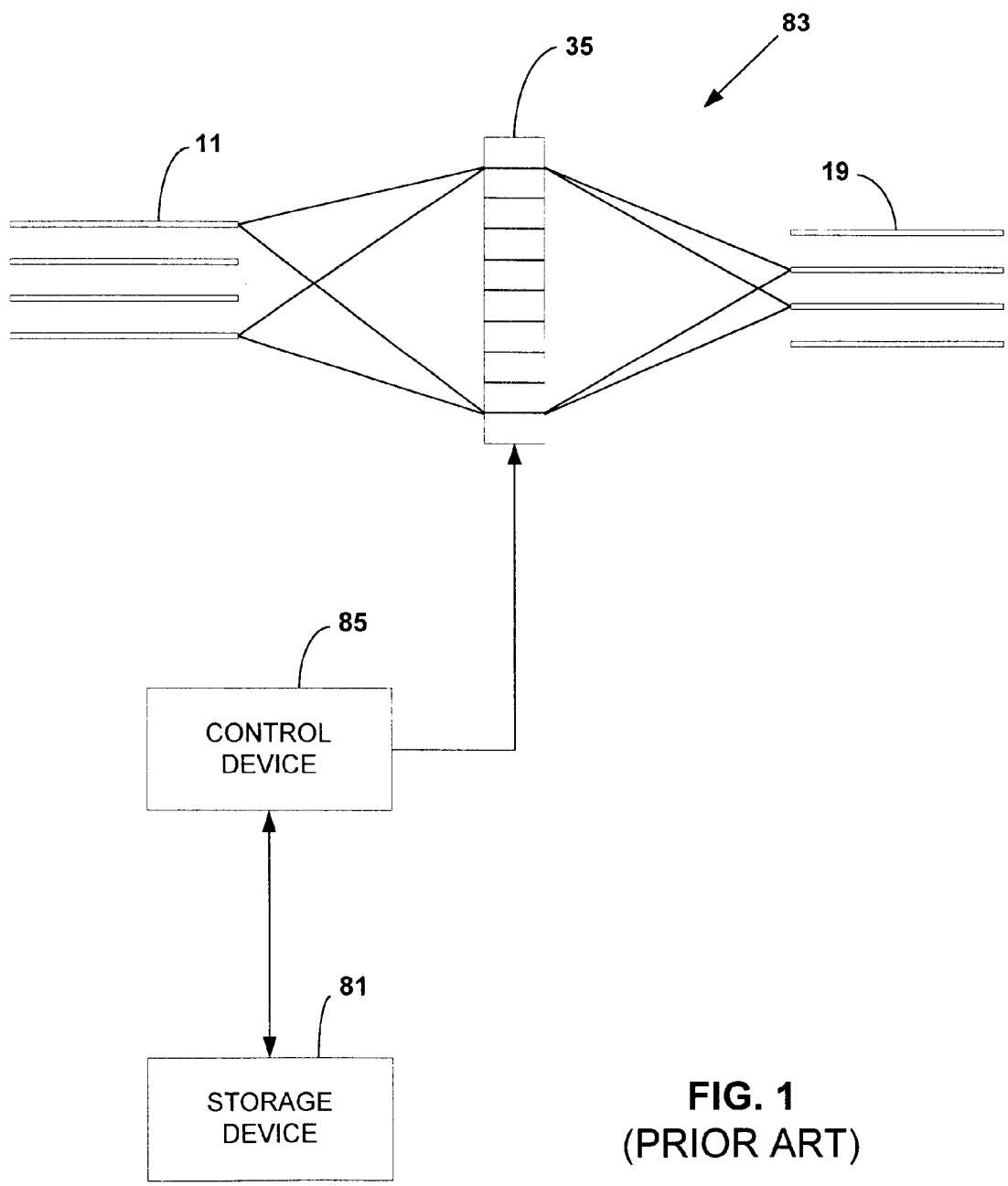
FIG. 1 is a diagram of a prior art optical switch.

An optical switch such as that disclosed in U.S. Pat. No. 5,768,242 is shown in FIG. 1. In this embodiment, holographic switching is employed to direct the signals received from the sources within the array 11 to the proper receivers within array 19. The objectives of an optical switch are to have a lot of light pass through the optical switch (efficiency) and for the light to land on the desired location (accuracy). These are not always compatible objectives. If one regards only the former (efficiency), then the choice of SLM drive value is the one that produces the largest amplitude transmittance. That clearly does not always create an accurate object lightwave that will land on the desired location. (An exception occurs when the SLM's operating curve is phase-only, in which case the amplitude is constant and phase freedom can be used to direct the lightwave).

Knowing the number of sources and receivers in arrays 11 and 19, the physical dimensions of the switch 83, and the characteristics of the reconfigurable liquid crystal device 35 (which may be generally referred to as an SLM), drive signal V may be determined for every possible required switching function. Thus, a plurality of drive signals V(0-n) are determined in advance based on the parameters and characteristics of the particular switch and stored in a storage device 81. When the switch is needed to perform a certain switching function, the appropriate drive signal Vx is retrieved from storage device 81 and applied to the SLM 35 by a control device 85. Pre-computing and storing the drive signals for use to control the SLM 35 allows the switching to be achieved using the full advantages of the speed and bandwidth of light transmission, with a higher degree of accuracy and greater throughput than was possible in prior art, with very high switching speeds (because no recalculation is necessary), and with virtually limitless reconfigurability. In addition, the actual characteristics of the SLM are used, and thus the method and apparatus do not suffer from a possibly inaccurate model of characteristics or inappropriately imputing ideal characteristics to the SLM.

The drive signals can be computed using the metric approach disclosed in U.S. Pat. No. 5,768,242 and as described in more detail in R. Juday, "Optimal realizable filters and the minimum Euclidean distance principle", Appl. Opt. 32, 5100–5111 (Sep. 10, 1993). Briefly, a metric is devised that measures how well the transmittance pattern on the SLM matches the design requirements of the objective ideal HOE. The basic steps of this process include: computing a complex transmittance pattern that would exactly meet the requirements for the desired hologram; designing a metric; and configuring the SLM to optimize the metric. In this approach, the metric is designed such that those factors to be maximized (e.g., transmission efficiency) are placed in the numerator and those to be minimized (e.g., errors or nonuniformity of spot intensities) are placed in the denominator. Alternately, factors to be maximized are added, factors to be minimized are subtracted. Thus, optimization is achieved by maximizing this metric using a suitable method (e.g., Monte Carlo, Simulated Annealing, or Random Walk). A metric, T, that might be important to the user of a holographic switch would take into account the connection properties of an optical switch, such as uniformity of the produced spots, the total amount of light entering the desired spots, and the largest cross-talk. One of such metrics, T, is shown as follows:

$$T = \frac{\text{Average intensity of desired connections}}{\left(\begin{array}{c}\text{Standard deviation of desired connection intensity} + \\ \text{maximum cross-talk intensity}\end{array}\right)}$$

The optimization of metrics similar to T is described in Richard D. Juday, "Generality of matched filtering and MED projection for optical pattern recognition", Journal of the Optical Society of America A (JOSA-A) (2001), which is incorporated herein by reference. After such optimization, the optical switch can best connect the input optical sources and the output optical drains with minimal undesired connections (cross-talk).

Some embodiments of the present invention relate to methods for minimizing cross-talk in optical connections. Minimization of cross-talk in optical connections is important for reducing the bit error rate (BER). A lower BER will permit increased interconnection. The prior art interconnects often use regularly spaced rectilinear arrays of input and output fiber geometry. With such a geometry, coherent buildup of diffractive sidelobes is exacerbated. The rectilinear geometry makes poor use of the available real estate. Such coherent buildup can be avoided by moving a receptive area off to the side of a rectilinear array of spots. An approach similar to the above-described metric optimization method (or an analytical method described in the following section) can be used to optimize the geometry of an optical switch to minimize cross-talk or to fine tune its performance.

In one embodiment of the present invention, locations of input and output fibers are so chosen that there is a great deal of entropy (apparent randomness) in their locations (as opposed to a prior art rectilinear array). The randomized locations allow cross-talk to be minimized while the desired connections are made. In this embodiment, randomization of the locations is accomplished by using an analytical solution. The analytical solution presumes that the extent of cross-talk depends inversely on the distance between the diffracted spot and the receiver location. Thus, the solution is found by maximizing the smallest such distance. The practical process begins with pseudo-random distributions of locations and drifts them in such a way as to improve the "minimum distance" among the combinations of diffracted spots and receiver locations to be avoided. The object of the process is to maximize this minimum distance, using a method that will be referred to as a "maxmin" method.

For example, let the unwanted i-j connection be the one with the minimum distance between the i-th input location's diffracted spot and the j-th output location; that is, i-j is closer than any other unwanted connection pair (this separation is called the maxmin distance). The vector from the diffracted i-th location on the output surface to the j-th receiving location provides information to the drift sub-algorithm as to how to adjust the redirection implemented by the hologram. The process then notes the maxmin distance as resulting from the initial pseudo-random distribution and the drift sub-algorithm, and then it tries another initial pseudo-random distribution followed again by the drift sub-algorithm. If the new distribution improves the maxmin distance, it is retained; otherwise, it is rejected. Growth of the maxmin distance is noted for the various pseudo-random trials, and the search is terminated when growth in the maxmin distance has ceased to indicate value in continuing. This process is similar to the Monte Carlo, Simulated Annealing, and Random Walk methods that are well known in the art. Any of these methods may be employed without departing from the scope of the invention.

It should be appreciated that although the method is illustrated with a planar distributions of input and output points, the discussion readily lends itself to three-dimensional distributions. A distribution of diffracted spots into three dimensions will generally be accompanied by reduced crosstalk. This is because a hologram (particularly for near-field computations) can easily include varying distances at which light is brought to a focus. Light that is sharply focused at one distance distributes with less intensity at other distances, and this effect can contribute to reducing cross-talk, as will be evident to those skilled in the art.

The above-described maxmin analytical approach assumes a monotonic light intensity change as a function of distance from the center of the spot. It is well known in the art that diffraction patterns of light do not always follow a monotonic function. Accordingly, in another embodiment, the cross-talk is not assumed to be a monotonic declining function of lateral distance. In this case, the cross-talk for a given distribution of transmitting and receiving points is calculated, and the drift algorithm is altered so that cross-talk is reduced as points are moved. This may be achieved with the maxmin analytical method described above.

Alternatively, methods similar to the Monte Carlo, Simulated Annealing, or Random Walk may be used to minimize the cross-talk. This is particularly significant in the three-dimensional implementation of the holographic connection. This embodiment would rely either on theoretical computations of the actual diffraction patterns from the properties of the light sources and the detailed diffracting shape of the hologram's unit element, or on physical measurements of the spots' diffraction patterns.

Other embodiments of the invention relate to methods for tuning an assembled optical switch. Individual assemblies of components can show deviation from expected behavior because the precise locations of input sources or output drains, or the location and orientation of the hologram-bearing modulator, are different from the design. This might arise due to manufacturing variations in individual elements or in variations in their assembly. One embodiment of the invention relates to a method for tuning an assembled optical switch to an initial setting to remove defects or errors arisen from the assembling process. The "initial setting" is a set of drive signal for controlling the SLM. This "initial setting" is computed on the basis of the expected locations of the input optical source and the output optical drain and the spatial disposition (location and rotational positions) of the SLM in the assembled optical switch. Although this method provides a quick way to get the switch started to operate, it does not correct any error due to variations inherent in the individual components (e.g., exact source or drain locations). Therefore, other embodiments of the invention relate to adaptive methods of light control in which an assembled device, after having been tuned to its initial settings, is further tuned for its individual behavior. These embodiments make direct observations of the connection strengths and cross-talk to use as the basis for adjusting the hologram. These methods should produce optical switches that are capable of achieving the best connections between the input optical sources and the output optical drains with minimal undesired connections (cross-talk). These embodiments permit looser tolerances in the assembly of the device, or a wider range of piece-part manufacturing tolerances, because the device can be tuned for performance after assembly.

For example, if the connection between an input source and an output drain is less than optimal because the source, the drain, or both are not at their expected locations vis-à-vis the hologram, the hologram can be tuned to cause small variations in the computed location of the output spot. Alternatively, the putative location of the input source can be dithered to the same effect. An interconnection weight function, which monitors how well the connection is made, can be used to guide the optimization of the connection. The interconnection weight function may be similar to a metric function described above.

Figure 2A:
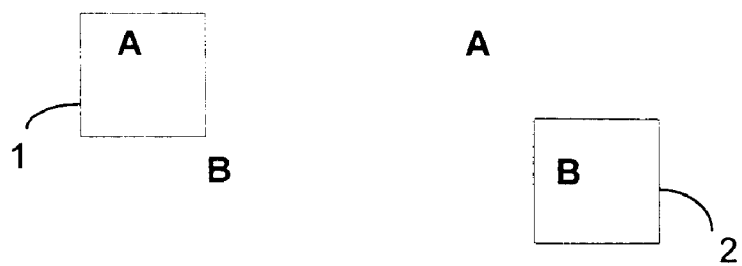
FIG. 2A is a diagram illustrating diffraction of incoming light beams onto destinations by an imperfect optical switch as in prior art.
Figure 2B:
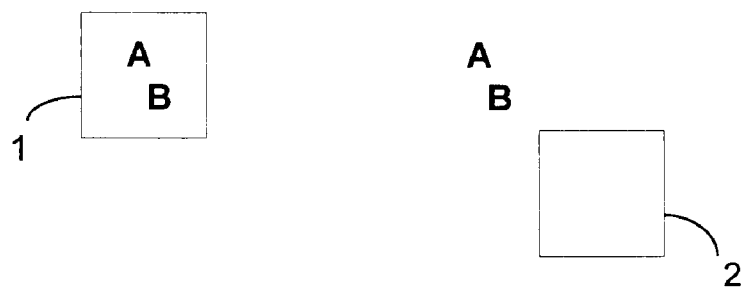
FIG. 2B is a diagram illustrating diffraction of incoming light beams onto destinations by an imperfect optical switch halfway through tuning according to one embodiment of the invention.
Figure 2C:
FIG. 2C is a diagram illustrating diffraction of incoming light beams onto destinations by a tuned optical switch according to one embodiment of the invention.

FIG. 2A illustrates an example of an assembled optical switch that does not perform as expected. Both beams A and B are supposed to be connected to both destinations 1 and 2 simultaneously. As shown in FIG. 2A, incoming beams A and B are not transmitted by the optical switch (not shown) to the intended destinations 1 and 2. In one method of the invention for tuning an optical switch, the assumed location of the incoming beam B is first tuned so that B is transmitted to the desired destination 1, even though this puts both beams A and B farther away from destination 2 (see FIG. 2B). Subsequently, the assumed location of destination 2 is tuned so that it will catch both the transmitted beams A and B (see FIG. 2C). The tuning at both stages can be accomplished by changing the control signal sent to the reconfigurable liquid crystal device 40 (see FIG. 4), rather than physically moving source B and destination 2 in the assembled switch. Because these tuning steps are performed virtually, it does not matter whether beam A or B is moved, or whether destination 1 or 2 is moved. It is impossible to anticipate all mis-positioning scenarios here, but those skilled in the art will appreciate that known information can be applied to computing the best set of virtual locations.

Figure 3:
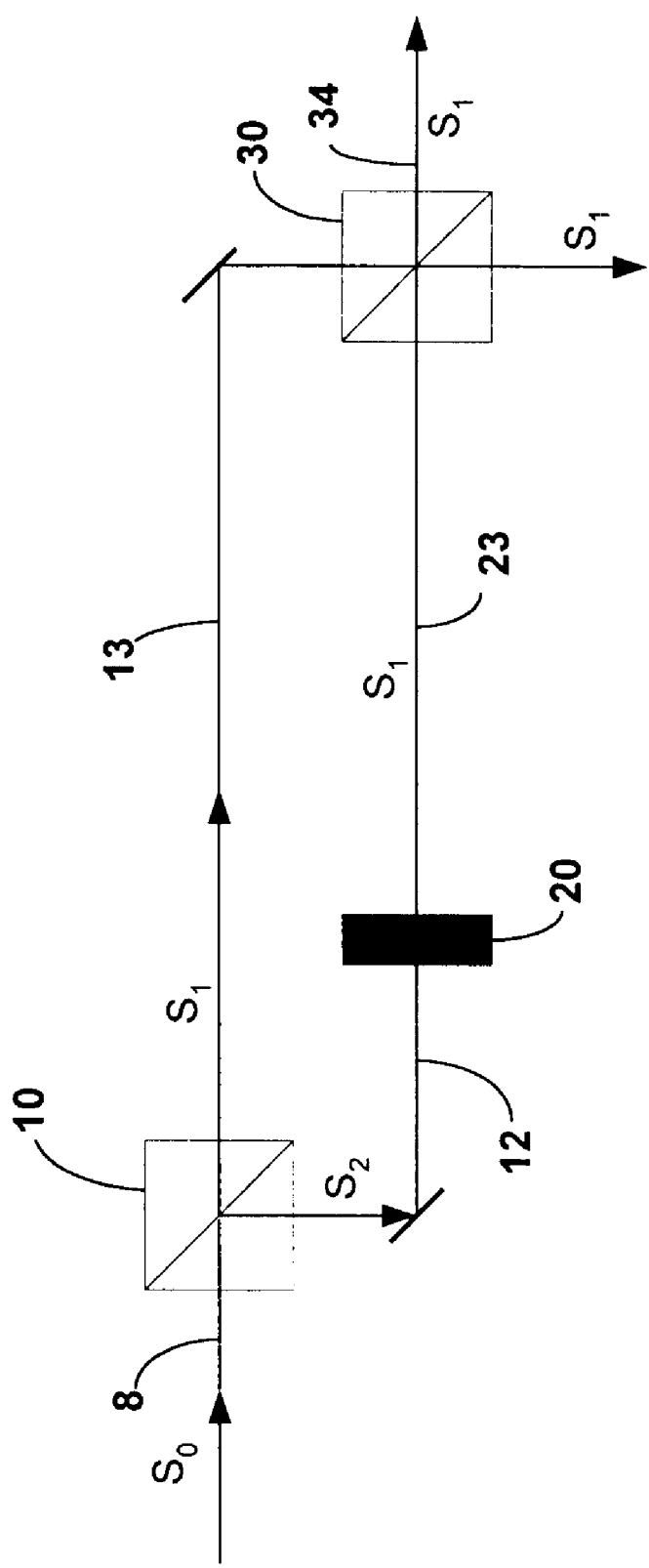
FIG. 3 shows a polarization rectifier in accordance with one embodiment of the invention.

Some embodiments of the present invention relate to polarization-independent optical switches. For many types of SLMs, the action is dependent on the states of polarization of the incoming light. The polarization state of incoming light from many kinds of fiber optic lines is often unknown, so modulation by a polarization-sensitive SLM tends to be highly variable. In one embodiment of the present invention, the incoming light can be converted into a single state of polarization at a cost of one half of the light intensity. FIG. 3 illustrates one such embodiment, which functions as a "polarization rectifier." The term "polarization rectifier" is used herein to generally refer to a device which converts an incoming beam with an arbitrary or unknown polarization into an outgoing beam with a single polarization and with a significant fraction (nominally half) of the incident light.

Referring to FIG. 3, incoming beam 8 having a polarization state $S_0$ is passed through a polarizing beam splitter 10 to generate two beams 12 and 13, having polarization states $S_2$ and $S_1$, respectively. The polarization states $S_1$ and $S_2$ are independent of each other. Beam 12 is passed through a wave plate 20 that changes the polarization state of beam 12 to produce beam 23, which has the same polarization state ($S_1$) as that of beam 13 or an appropriate polarization state so that in view of the exact optical paths that beams 13 and 23 traverse, the beams are in the same state when they arrive at beam combiner 30. Both beams 13 and 23 are then passed through a non-polarizing beam splitter functioning as a beam combiner 30, where both beams 13 and 23 are partially transmitted and partially reflected. Thus, beams 13 and 23 each contribute about half of their intensity to produce a combined beam 34, which has a particular polarization state. The net result from these processes is that the combined beam 34 is about half as intense as the incoming beam 8; however, the combined beam 34 is of a single specified polarization state, whereas the incoming beam 8 has an unknown, and perhaps randomly changing, polarization state. It should be appreciated that the change to the known polarization state $S_2$ of beam 12 effected by the waveplate 20 should be such that when beams 13 and 23 arrive at the beam combiner 30, they will be in the same states of polarization so that they will be fully balanced as they exit the beam combiner 30. In that fashion the modified input beam 23 has been made suitable for the subsequent recombination with the input beam 13, before being impinged upon the spatial light modulator. In the arrangement of FIG. 3 the path lengths traversed by beams 13 and 23 from their separation at polarizing beam splitter 10 and before they are recombined are made equal, well within the tolerance expressed as the minimum of the coherence length of the light in the beams or the length in which an element of modulation resides. Sometimes, it is advantageous to have beams 13 and 23 propagate into combined beam 34 at a small angle with respect to each other so that they cause a pattern of interference fringes whose widths at the optical drain are smaller than that of the optical drain so that these interference fringes would land inside the collecting optics. In this fashion, the system will be less sensitive to path length difference between beams 13 and 23. If beams 13 and 23 are parallel, they will have essentially zero-fringe interference.

In this case, a slight change in path length difference (e.g., less than a wavelength) between beams 13 and 23 will cause a significant change in the amount of light propagating into the collecting optics because constructive or destructive interference occurs over the entire aperture. On the other hand, if beams 13 and 23 propagate at a small angle so that many fringes land at the optical drain, then small path length differences would merely move these fringes around inside the collecting optics. The combined beam 34 may be further converted from the particular polarization state as it exits the beam combiner into a different particularly polarized state (to produce an effect desired from a spatial light modulator) by passing it through further polarization modifying optics or other means well known to those skilled in the art.

The particular arrangement in FIG. 3 transmits light with a single polarization state at the expense of intensity. If the polarization state of the incoming light is known and is suitable for the optical switch, it will not be necessary to use such a polarization-forcing optics. Furthermore, FIG. 3 illustrates one example of how to render an incoming light with a random polarization state into a light beam with a single polarization state. One skilled in the art will appreciate that other arrangements of polarization-affecting optics may produce the same general effect of transmitting light in a specific polarization state.

Figure 4:
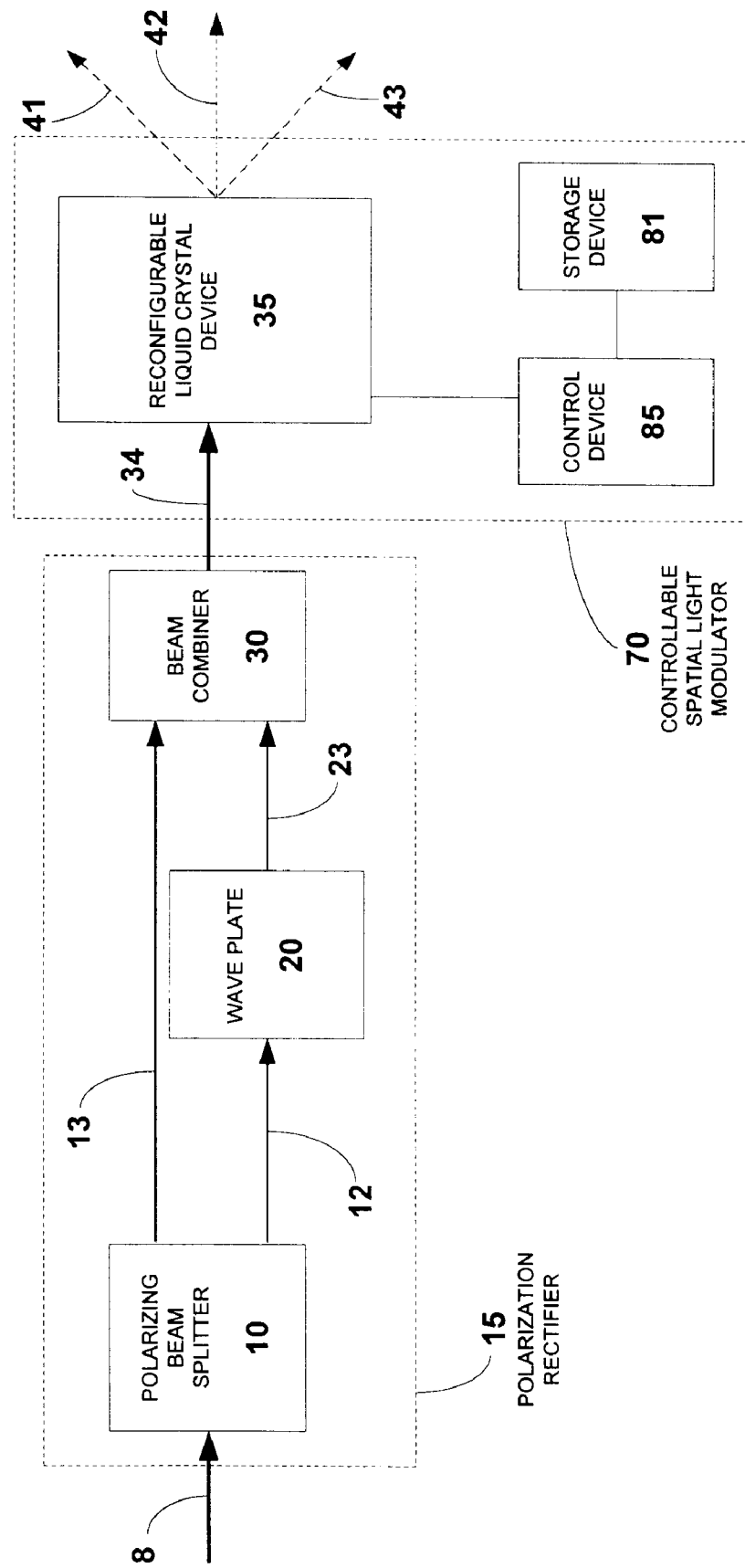
FIG. 4 illustrates a polarization-independent optical switch in accordance with one embodiment of the present invention.

An optical switch in accordance with one embodiment of the invention is shown in FIG. 4. In this embodiment, holographic switching is employed to direct incoming beam 8 to pass through a polarization rectifier 15, which is similar to the device shown in FIG. 3, and a controllable spatial light modulator 70 so that the light is diffracted or transmitted in any one of the desired directions as illustrated by the outgoing beam 41, 42, and 43.

First, the incoming beam 8, which may have any polarization, is passed through the polarizing beam splitter 10, which splits the incoming beam 8 into two beams 12 and 13, which are polarized independently with respect to each other. An ideal polarizing beamsplitter produces orthogonal polarizations, but, in actual fact, polarizing beamsplitters will not always produce such orthogonal states. The present invention accommodates beams that are merely independently polarized rather than requiring them to be orthogonal. Beam 12 is passed through the wave plate 20, which changes the polarization of beam 12 to be the same as that of beam 13 or to a polarization state suitable for subsequent recombination with beam 13. Afterwards, beam 13 and beam 23 are combined using the non-polarizing beam splitter functioning as a beam combiner 30 to give a particularly polarized beam 34. The particularly polarized beam 34 is passed through a controllable spatial light modulator (SLM) 70, which includes a reconfigurable liquid crystal device 35, a control device 85, and a storage device 81. The controllable SLM 70 can be used to diffract beam 34 in any desired direction such as 41, 42, or 43. The controllable SLM 70 achieves this diffraction by using the control device 85 to control the reconfigurable liquid crystal device 35 using a predetermined drive signal stored in the storage device 81. The predetermined drive signals are determined using the metric and optimization method described in detail above. When a certain switching function is desired, the appropriate drive signal is retrieved from storage device 81 and applied to the reconfigurable liquid crystal device 35 by the control device 85. This allows the switching to be achieved using the full advantages of the speed and bandwidth of light transmission, with a higher degree of accuracy and greater throughput than was possible in prior art, with very high switching speeds (because no recalculation is necessary), and with virtually limitless reconfigurability. In addition, the actual characteristics of the reconfigurable liquid crystal device 35 are used and thus the method and apparatus do not depend on a possibly inaccurate model of its characteristics nor on unnecessary assumptions about its behavior.

Although the embodiment illustrated in FIG. 4 uses a transmissive SLM, the invention is equally applicable to a reflective SLM, which reflects the output light beams back to the same side of the SLM as the input light sources. The term "mirror" is used herein to refer to either a separate mirror component or a reflective action inherent to the SLM.

While the invention has been described using a limited number of examples, those skilled in the art, having the benefit of this disclosure, will appreciate that other variations are possible without departing from the scope of the invention as disclosed herein. Accordingly, the scope of the invention should be limited only by the attached claims.

What is claimed is:

1. An optical switch for switching an incoming beam from at least one input optical source to at least one output optical drain, comprising:

a polarizing beam splitter that splits the incoming beam into a first input beam and a second input beam, the first input beam and the second input beam having polarizations that are mutually orthogonal;

a wave plate optically coupled to the second input beam that modifies the polarization of the second input beam to generate a modified second input beam having a polarization suitable for subsequent recombination with the first input beam;

a beam combiner optically coupled to the first input beam and the modified second input beam to produce a combined beam; and a controllable spatial light modulator optically coupled to the combined beam, wherein the combined beam is transmitted by the controllable spatial light modulator to generate a pattern of light spots landing on the at least one output optical drain.

2. The optical switch of claim 1, wherein the controllable spatial light modulator comprises a reconfigurable liquid crystal device, a control device, and a storage device.

3. The optical switch of claim 1, further comprising a mirror optically coupled to the controllable spatial light modulator to reflect the pattern of light spots generated by the controllable spatial light modulator.

4. An optical switch for switching an arbitrarily polarized incoming beam from at least one input optical source to at least one output optical drain, comprising:

means for converting the arbitrarily polarized incoming beam into a particularly polarized output beam; and a controllable spatial light modulator optically coupled to the particularly polarized output beam, wherein the particularly polarized output beam is diffracted by the controllable spatial light modulator to generate a pattern of light spots landing on the at least one output optical drain.

5. The optical switch of claim 4, wherein the controllable spatial light modulator comprises a reconfigurable liquid crystal device, a control device, and a storage device.

6. The optical switch of claim 4, further comprising a mirror optically coupled to the controllable spatial light modulator to reflect the pattern of light spots generated by the controllable spatial light modulator.

7. An optical switch for switching an incoming beam from at least one input optical source to at least one output optical drain, comprising:

means for splitting the incoming beam into a first input beam and a second input beam, the first input beam and the second input beam having polarizations that are mutually orthogonal;

means for modifying the polarization of the second input beam to generate a modified second input beam having a polarization suitable for subsequent recombination with the first input beam;

means for producing a combined beam from the first input beam and the modified second input beam; and means for transmitting the combined beam to generate a pattern of light spots landing on the at least one output optical drain.

8. An optical interconnect system, comprising:

a plurality of input optical sources;

an optical switch optically coupled to the input optical sources, wherein the optical switch comprises a controllable spatial light modulator; and a plurality of output optical drains optically coupled to the optical switch, wherein the input optical sources and the output optical drains are not arranged in a rectilinear geometry.

9. The optical interconnect system of claim 7, wherein the optical switch further comprises a polarization rectifier.

10. An optical interconnect system, comprising:

a plurality of input optical sources;

an optical switch optically coupled to the input optical sources, wherein the optical switch comprises a controllable spatial light modulator; and a plurality of output optical drains optically coupled to the optical switch, wherein the input optical sources and the output optical drains are not arranged in a co-planar geometry.

11. The optical interconnect system of claim 9, wherein the optical switch further comprises a polarization rectifier.

12. A method for switching an optical network connection from at least one input optical source to at least one output optical drain, comprising:

passing at least one incoming beam from the at least one input optical source through a polarization rectifier to produce at least one particularly polarized beam; and passing the at least one particularly polarized beam through a controllable spatial light modulator, wherein the at least one particularly polarized beam is diffracted by the controllable spatial light modulator to form at least one light spot landing on the at least one output optical drains.

13. A method for manufacturing a controllable spatial light modulator-based optical switch, comprising:

assembling an optical switch comprising a controllable spatial light modulator, at least one input optical source, and at least one output optical drain; and tuning an initial setting of the controllable spatial light modulator, wherein the initial setting is a drive signal for the controllable spatial light modulator computed on the basis of the assembled locations of the at least one input optical source and the at least one output optical drain and the spatial disposition of the controllable spatial light modulator.

14. The method of claim 13, wherein the assembling comprises placing the controllable spatial light modulator between the at least one input optical source and the at least one output optical drain.

15. The method of claim 13, further comprising tuning the controllable spatial light modulator to best connect the at least one input optical source to the at least one output optical drain.

16. The method of claim 15, further comprising tuning the controllable spatial light modulator to minimize undesired connections between the at least one input optical source and the at least one output optical drain.

17. An optical polarization rectifier for converting an arbitrarily polarized incoming beam into a particularly polarized beam, comprising:

a polarizing beam splitter that splits the arbitrarily polarized incoming beam into a first input beam and a second input beam, the first input beam and the second input beam having polarizations that are mutually orthogonal;

a wave plate optically coupled to the second input beam that modifies the polarization of the second input beam to generate a modified second input beam having a polarization suitable for subsequent recombination with the first input beam; and a beam combiner optically coupled to the first input beam and the modified second input beam to combine the first input beam and the modified second input beam into the particularly polarized beam output from the optical polarization rectifier.

18. The optical polarization rectifier of claim 17, further comprising polarization modifying optics optically coupled to the particularly polarized beam to produce a different particularly polarized beam.

* * * * *